C. H. KICKLIGHTER.
VOLTAGE REGULATOR.
APPLICATION FILED JUNE 16, 1911.

1,252,451.

Patented Jan. 8, 1918.
7 SHEETS—SHEET 1.

WITNESSES:
B. M. Kent
A. G. Hansmann

INVENTOR
Charles H. Kicklighter
BY
Foster, Freeman, Watson & Coit
ATTORNEY

C. H. KICKLIGHTER.
VOLTAGE REGULATOR.
APPLICATION FILED JUNE 16, 1911.

1,252,451.

Patented Jan. 8, 1918.

WITNESSES:

INVENTOR
Charles H. Kicklighter
BY
ATTORNEY

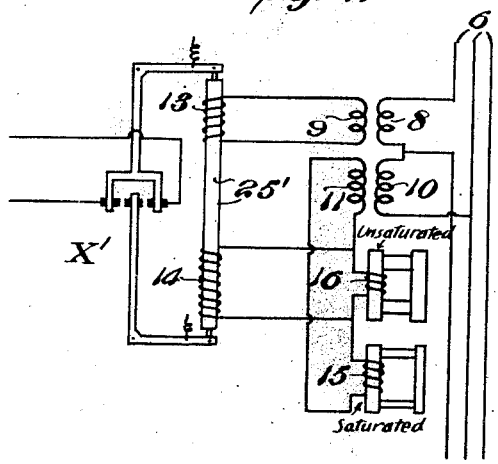
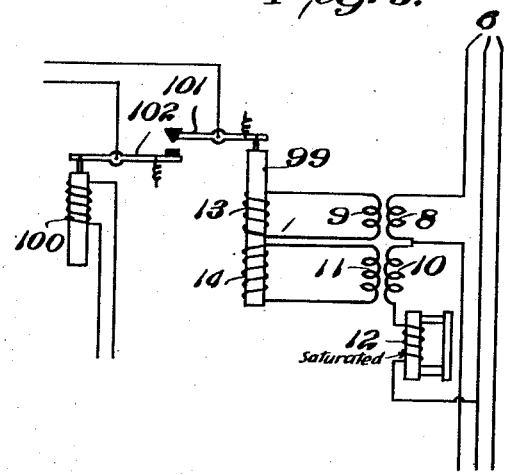
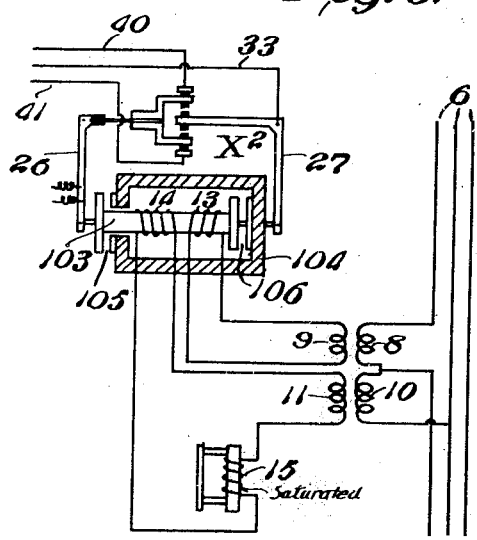
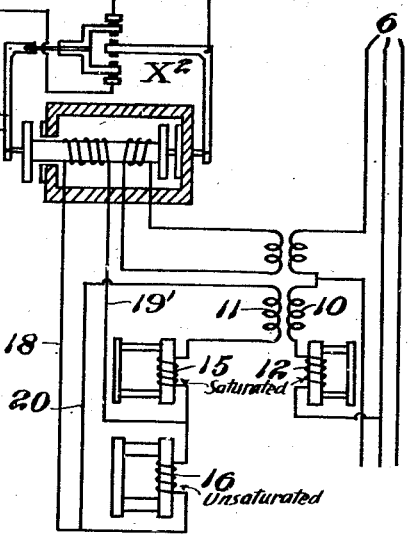

C. H. KICKLIGHTER.
VOLTAGE REGULATOR.
APPLICATION FILED JUNE 16, 1911.

1,252,451.

Patented Jan. 8, 1918.
7 SHEETS—SHEET 5.

WITNESSES:
B. M. Kent
A. E. S. Hansmann

INVENTOR
Charles H. Kicklighter
BY
Faxter, Freeman, Watson & Coit
ATTORNEY

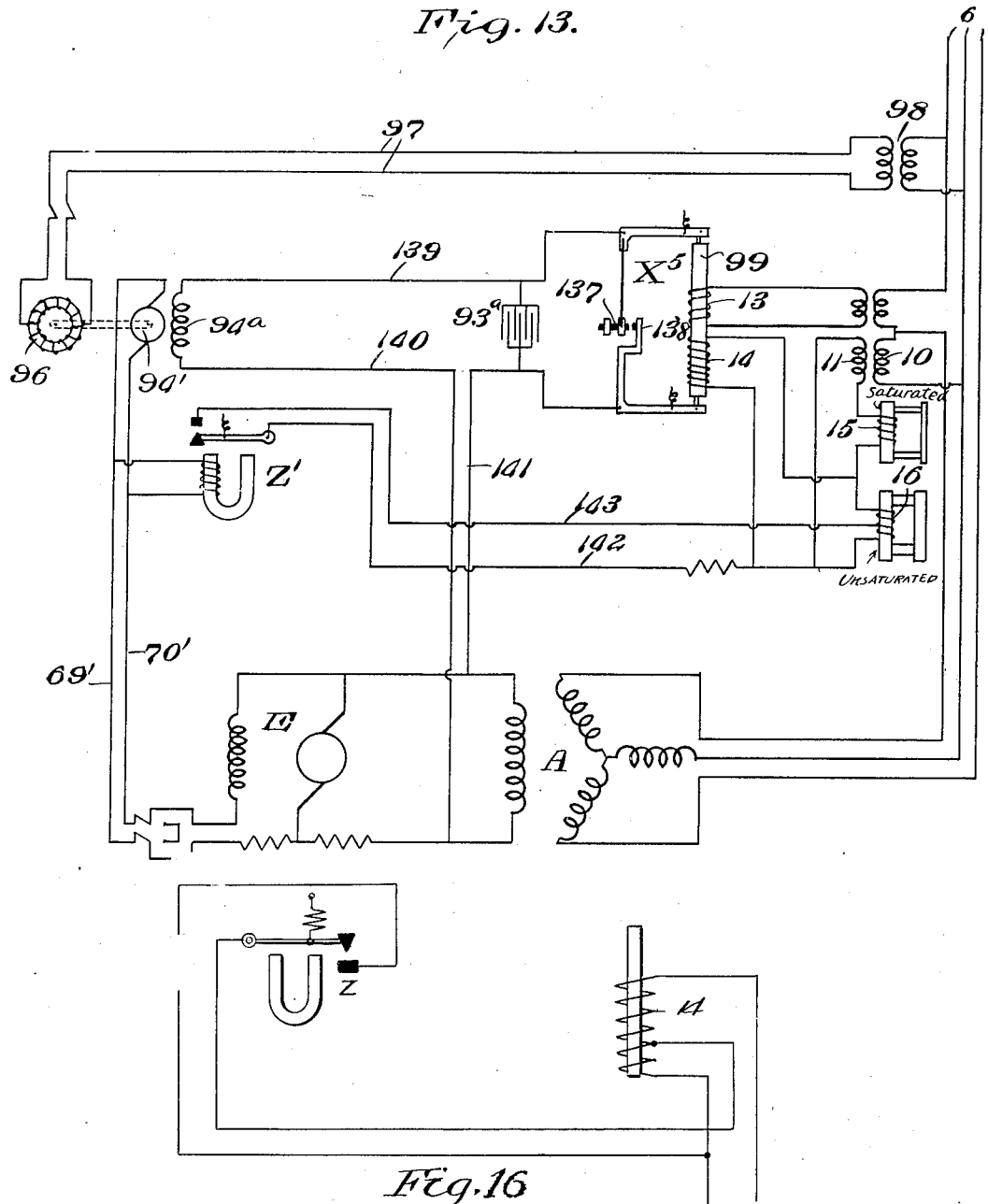

C. H. KICKLIGHTER.
VOLTAGE REGULATOR.
APPLICATION FILED JUNE 16, 1911.
1,252,451.
Patented Jan. 8, 1918.
7 SHEETS—SHEET 7.
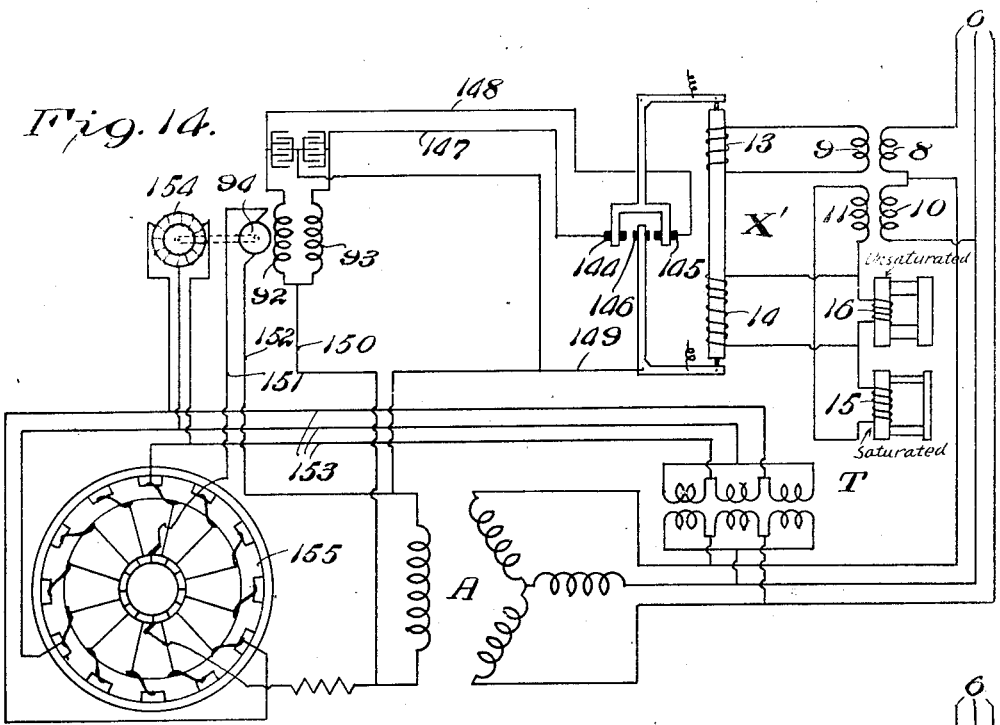
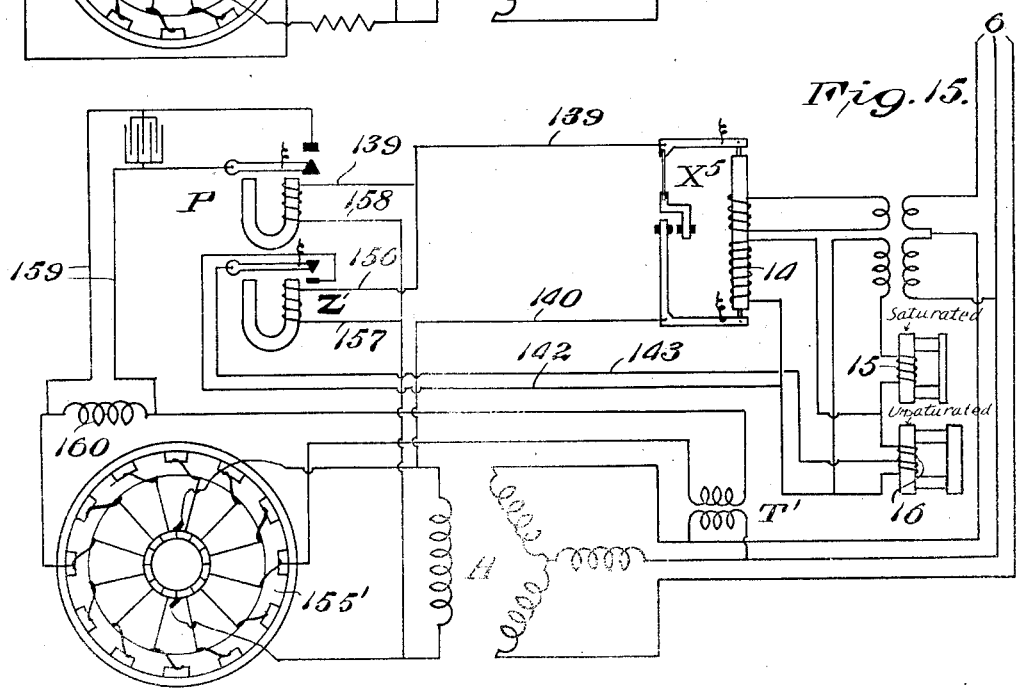
WITNESSES:
B. M. Kent
A. E. J. Hansmann
INVENTOR
Charles H. Kicklighter
BY
Foster, ......
ATTORNEY

UNITED STATES PATENT OFFICE.

CHARLES H. KICKLIGHTER, OF PASADENA, CALIFORNIA, ASSIGNOR TO WESTINGHOUSE ELECTRIC & MANUFACTURING COMPANY, A CORPORATION OF PENNSYLVANIA.

VOLTAGE-REGULATOR.

1,252,451.  Specification of Letters Patent.  Patented Jan. 8, 1918.

Application filed June 16, 1911. Serial No. 633,639.

*To all whom it may concern:*

Be it known that I, CHARLES H. KICKLIGHTER, a citizen of the United States, and resident of Pasadena, in the county of Los Angeles and State of California, have invented certain new and useful Improvements in Voltage-Regulators, of which the following is a specification.

My invention relates to apparatus for use in connection with the distribution circuits of alternating electric currents. In certain of its features, the invention has particular reference to automatic voltage regulators, while in some of its broader aspects, it may be said to relate to alternating current electro-responsive or translating devices generally.

In voltage regulators, volt meters, and similar apparatus, as heretofore constructed, it has been found very difficult to produce an instrument equipped with a winding having a sufficient resistance to withstand the necessarily high voltage met with in practice, and at the same time possessing the necessary sensitiveness to enable it to respond accurately to slight changes in the voltage impressed upon it. Heretofore, any increase in sensitiveness, has been accompanied by a corresponding increase in the delicacy and cost of the instrument, and a consequent decrease in its ability to stand up under the conditions imposed by practical service.

The primary object of the present invention is, therefore, broadly, to provide means whereby such apparatus may be rendered extremely sensitive to slight variations in voltage, and, at the same time, simple in construction and comparatively low in price.

More specifically, the invention contemplates an improved automatic voltage regulator having the above characteristics, and which may be employed in connection with any of the well known forms of arrangements for controlling A. C. circuits.

A further object is to provide means, in connection with a regulating device or relay, and thrown into operation by the movement of such device, for automatically restoring the device to normal position. Such improved means lends itself particularly to use with my novel means for increasing the sensitiveness of the instrument.

A still further object of the invention is to provide, in connection with a regulating device of the character indicated, a pair of relays for controlling the voltage of the generator to be regulated, one of said relays being sluggish in its movements, and adapted to respond to gradual or large changes of voltage, and the other of said relays being sensitive and quick acting, and adapted to respond to the sudden or slight variations.

Other objects and advantages of my invention will hereinafter appear, and the novel features thereof will be specifically pointed out in the appended claims.

In order that my invention, and some of the ways in which it can be applied, may be clearly understood, reference is had to the accompanying drawings forming part of this specification, and in which:—

Figs. 4, 5, 6 and 7 are elementary diagrams all illustrating various embodiments of my invention as applied to slightly different forms of regulating apparatus;

Fig. 13 is a diagram showing my invention as applied to still another style of regulating apparatus; and Figs. 14 and 15 show systems in which my sensitiveness increasing device is employed in combination with a generator having a field excited by means of a magnetic rectifier;

Fig. 16 illustrates a modification of the circuit connections.

Figure 1:
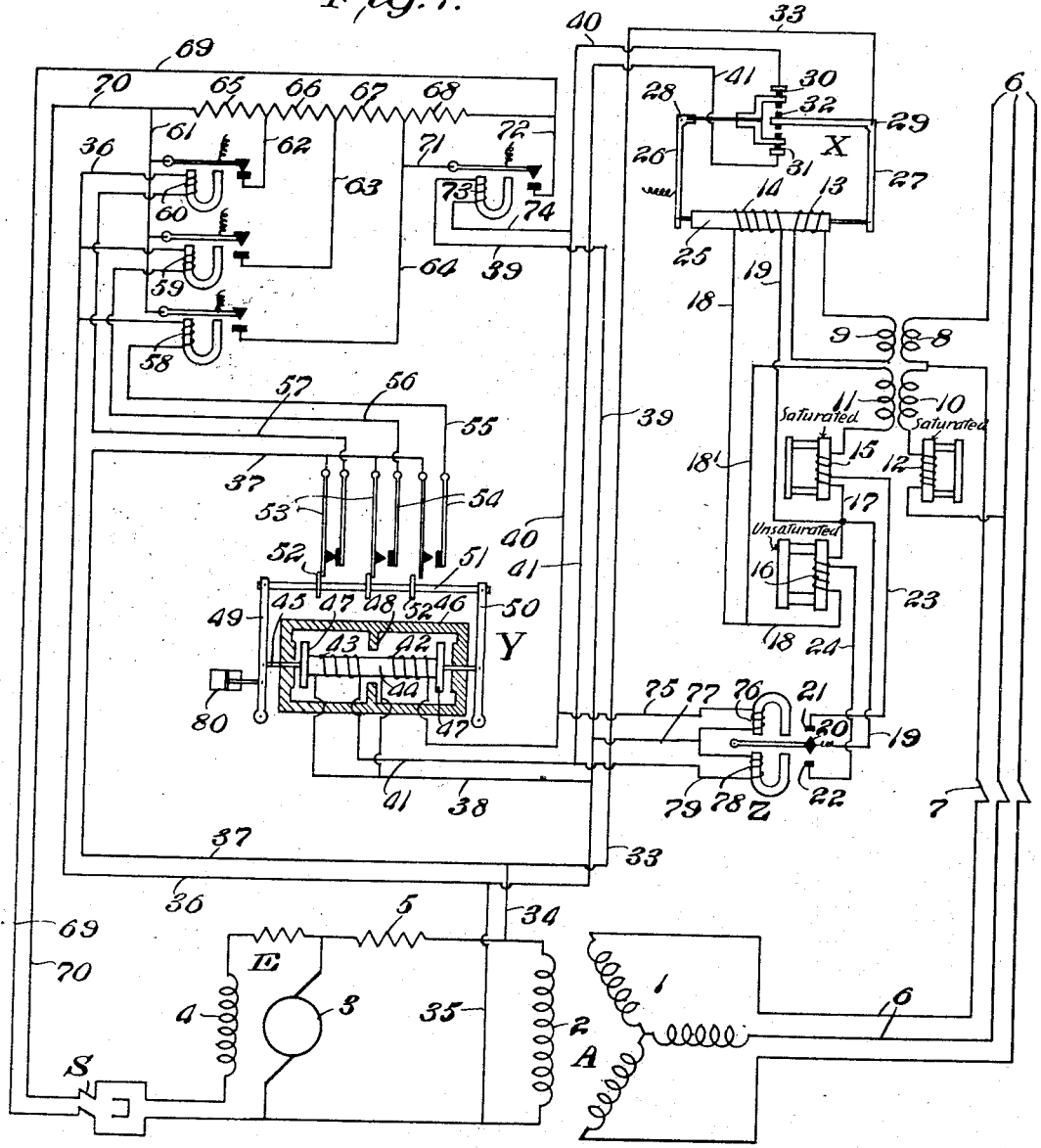
Figure 1 is a diagram illustrating one form of my invention as applied to a voltage regulator for a 3-phase generator.

Referring to the drawings in detail, and more particularly to Fig. 1 thereof. A indicates the machine to be regulated, and is shown as a 3-phase alternator having an armature 1 and a field 2. The field is supplied with current by means of an exciter E, comprising an armature 3 and field 4. A resistance 5 is preferably included in the circuit between the exciter and the alternator field.

The armature 1 of the alternator is connected to the outgoing mains 6, a usual switch 7 being included in the circuit.

To the mains 6 is connected a current transformer comprising a secondary 9, and a primary 8, in series with one of the line wires, and a potential transformer having a secondary 11, and a primary 10 connected across a pair of such line wires.

A regulating device X is provided and is constructed with a coil 13 connected with the secondary 9 of the current transformer and with a pressure coil 14 which is arranged to have voltage impressed upon its terminals by means of the secondary 11 of the potential transformer. The features so far described are the same as those shown in my co-pending application Serial No. 584,558, filed September 29, 1910.

In order to increase very largely the sensitiveness of the regulating device X however, I make use of the novel arrangement which will now be described. This arrangement consists in the employment of one or more saturated choke coils in connection with the potential transformer. As illustrated in Fig. 1, I arrange one such choke coil as indicated at 12 in series with the primary 10 of the potential transformer and another such choke coil, as indicated at 15, in series with the secondary of such transformer, such coil being also in series with the pressure coil 14 of the regulating device. These choke coils preferably contain cores having substantially closed magnetic circuits, which cores are so designed as to be normally worked at a very high degree of magnetic density. This may be readily accomplished by properly proportioning the size of the core and coil in a manner well known to electrical engineers.

In order to still further facilitate the operation of the regulating device, I provide an unsaturated impedance coil 16 and connect it in shunt with the pressure coil 14, for a purpose which will appear hereafter. From one side of the secondary 11 extends a wire to the choke coil 15, from which a conductor 17 extends to impedance coil 16, which, in turn, is connected by a wire 18 with one side of the pressure coil 14. From the other side of this pressure coil extends a wire 19 to a movable contact 20 carried by the armature of a relay device Z hereinafter described. The wire 19 is also connected to the wire 17 at a point between the coils 15 and 16. A wire 18' extends from the wire 18 at a point between the impedance coil and pressure coil to the other side of the secondary 11. Contacts 21 and 22 are arranged at each side of the contact 20 and are connected by means of wires 23 and 24, respectively, with intermediate points of the coils 15 and 16, respectively.

The improved regulating device shown in Fig. 1, of the drawings, preferably comprises a core 25 which is encircled by the coils 13 and 14, and which is pivotally supported in a horizontal position at the lower ends of bell-crank levers 26 and 27 pivoted at 28 and 29 to a fixed support. One of these levers, such as 26, carries at its other end a pair of spaced insulated contacts 30 and 31, preferably supported on a resilient arm as shown. The other lever, such as 27, carries a double contact 32 which is adapted to play between and engage contacts 30 and 31.

From the lever 27, which carries contact 32, extends a wire 33 which is connected by a wire 34, with one side of the exciter E, while the other side of the exciter is connected by a wire 35 with a wire 36, to which is connected the common return 38 extending from the coils of a relay device Y now to be described, while from contacts 30 and 31 of the regulating device X extend wires 40 and 41, respectively, to coils 42, 43, of the relay Y, the other side of these coils being connected to the common return wire 38 above referred to.

The coils 42 and 43 encircle a horizontally extending core 44 which is supported loosely by rods 45 within a frame 46 of iron or other magnetic material. The core 44 is provided with annular shoulders or collars 47, and between the coils 42 and 43 are arranged inwardly projecting fins 48 which extend to within a short distance of the core 44. The purpose of the above described construction is to provide a relay in which an independent magnetic circuit is afforded for the flux of each coil, and it is desirable that such magnetic circuit should be made as nearly closed as possible so that the device may be highly self inductive.

The projecting ends of the rods or spindles 45 are pivotally connected with a pair of levers 49 and 50, pivotally supported at one end and pivotally connected at their other end by means of a cross bar 51. This cross bar carries a number of projections or lugs 52 which are adapted to engage the ends of contact springs 53 and move them into engagement with corresponding contact springs 54, the arrangement being such that the springs 53 are engaged and moved successively by the lugs 52.

Three pairs of contact springs are shown by way of illustration, and the springs 54 are connected by means of wires 55, 56 and 57 with the coils of relays 58, 59 and 60, the other side of such coils being connected to the wire 36 which extends to the exciter. The springs 53 are all connected to the common return wire 37 which extends to the other side of the exciter as above explained. It will therefore be seen that a movement of the bar 51 toward the right will produce the successive energization of the relays 58, 59 and 60 in the reverse order.

In series with the exciter field 4 is arranged a resistance which is connected therewith by means of leads 69, 70. This resistance is shown as consisting of a number of sections 65, 66, 67 and 68, normally all connected in series. Wires 62, 63 and 64, however, extend from the meeting ends of such sections to contacts adapted to be closed by the relays 60, 59 and 58, respectively, and it is therefore evident that when any relay such, for instance, as 60, is energized, the corresponding contact will be closed and the corresponding section of resistance, such as 65, will be short circuited by means of wires 61 and 62.

Connected with the wire 64 is the armature of an additional relay 73, such armature being adapted to engage a contact connected with a wire 72 in such a manner that when the relay is energized the contact will be closed and the section 68 of the resistance short circuited by means of the wires 71 and 72. This relay 73 is connected on one side by means of a wire 39 with one pole of the exciter, and on the other side by means of a wire 74 with the wire 40 extending to contact 30.

The relay Z, above referred to, comprises two coils 76 and 78 connected by means of wires 75, 77 and 79 with the conductors 40, 39 and 41, respectively.

Figure 9:
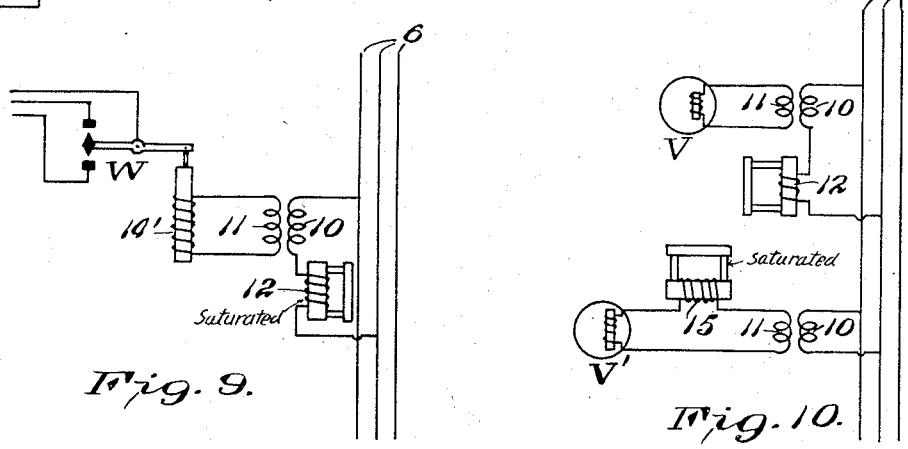
Figs. 9 and 10 are elementary diagrams illustrating my invention as applied to voltmeters or indicators.
Figure 10:
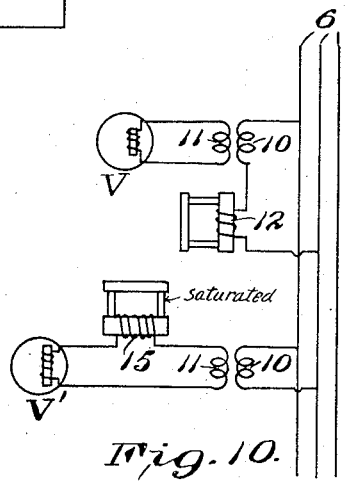

Before going into a discussion of the operation of the system shown in Fig. 1 reference will first be had, for the sake of clearness, to the elementary diagrams shown in Figs. 9 and 10. Referring first to Fig. 10, I have illustrated an ordinary volt meter V connected to the secondary 11 of a potential transformer, the primary 10 of which is connected across the line in series with a saturated choke coil 12. Also in Fig. 10 I have illustrated a second volt meter V' connected to the secondary 11 of a potential transformer, a saturated choke coil 15 being connected in series with such secondary and volt meter. Considering this last arrangement, the principle upon which the saturated choke coil operates will be clear from an illustration.

We will suppose, for example, that the pressure generated by the secondary 11 is 95 volts. This is opposed by an equal and opposite counter pressure, consisting of two components in quadrature. One of these is the counter-electromotive force of self-inductance of the over-saturated choke coil 15; and the other is the current-resistance-drop due to the resistance in circuit, which occurs mainly through volt-meter V'.

Let it now be supposed that the pressure, generated by the secondary 11 increases 5 volts, from 95 to 100 volts. The equal and opposite counter-pressure, consisting of its two components in quadrature, must also increase a like amount. The counter-electromotive-force of self-inductance of the choke coil can increase but slightly due to its highly saturated condition. Hence, it is evident that such an increased current must flow that a sufficient current resistance-drop will be developed in the circuit. It is necessary that this latter be sufficiently large to combine in quadrature with the small increase of counter-electromotive-force of self-inductance and give a resultant counter-pressure sufficient to oppose the impressed pressure. The resistance of the circuit may be quite large. Suppose the voltage drop in this resistance under the above conditions were doubled. It is thus seen that while the impressed voltage increased from 95 to 100 volts or a little over 5%, the current through the instrument V' was doubled or increased 100%. It will therefore be seen that slight variations of line pressure may, by the use of a saturated choke coil, be many times magnified and a volt meter or other translating device made to respond very readily to such changes.

The same effect may be produced by connecting a choke coil 12 in series with the primary of the potential transformer as illustrated in the upper part of Fig. 10. This arrangement is also shown in Fig. 9, in which the secondary 11 is shown as connected to the coil 14' of a contact making volt meter W or similar device.

Referring again to Fig. 1, it will be seen that I have illustrated the simultaneous use of both coils 12 and 15, one in series with the primary and the other in series with the secondary of the potential transformer. This results in still further magnifying the effect of slight variations of line pressure. In other of the figures I have illustrated choke coils 12 or 15 as used either independently or jointly, and it will be understood that I contemplate the use of such coil in connection with any electro-responsive or translating device whether connected to a transformer secondary as a source of current, or directly to a generator itself, without the interposition of a transformer. In fact, in the embodiment shown in Fig. 9, the transformer primary 10 may itself be considered an electro-responsive or translating device connected in series with a choke coil and with a source of current. It is thought this will be clear without further discussion.

With the foregoing explanation, we will suppose a slight rise of pressure to take place on the line 6 of Fig. 1. This at once results, as explained above, in a large proportional change in the voltage impressed upon the terminals of pressure coil 14 of regulating device X.

Such pressure coil therefore becomes more strongly energized and draws the core 25 toward the right, thus forcing contacts 31 and 32 into engagement. Current then flows from one side of the exciter circuit through wires 34 and 33, lever arm 27, contacts 32, 31, wire 41, to and through coil 43 of relay Y, thence through common return 38 and wire 35 to the other side of the exciter circuit. This energizes coil 43 and tends to move the core 44 of relay Y to the left. The movement of this relay is preferably retarded as by means of a dash pot 80, and is therefore rather sluggish, but if the rise of voltage is prolonged for any appreciable interval of time, the bar 51 will be shifted to the left far enough to move the lug 52 out of engagement with the first spring 53 and thus open the circuit including wire 57 leading to relay 60. This relay is thus deënergized and its contact opened so as to insert the section 65 of resistance in the exciter field circuit and thereby reduce the excitation and consequently the voltage of the generator A. At the same time that the coil 43 is energized, the coil 78 of relay Z also receives current and its armature is moved so as to bring contacts 20 and 22 into engagement, thus short-circuiting a portion of the winding of impedance coil 16 and thereby reducing the drop across its terminals. Since the pressure coil 15 is connected in shunt or parallel with the impedance coil 16, such reduction in voltage across the terminals of the latter results in decreasing the voltage impressed upon coil 14, and thereby serves to restore the relay X to its original position.

If a slight decrease in the line voltage takes place the opposite result will be produced. The voltage impressed upon the coil 14 will be decreased, and the core 25 will be drawn by the spring toward the left, thus forcing the contacts 30 and 32 into engagement and energizing coil 42 of relay Y over the conductors 40 and 33 as will be evident. This causes the core 44 of relay Y to begin to move toward the right, but such movement is retarded by the dash pot and in case the drop in voltage on the line is only momentary the core will not move far enough to produce any effect.

At the same time, however, that the coil 42 is energized, the relay 73 also receives current, since it is connected in parallel with the coil 42. This relay 73 is very sensitive and quick acting, so that immediately upon its energization it pulls its armature down and closes the circuit between wires 71 and 72 thus short-circuiting sectional resistance 68 and permitting a greater excitation of the field of the exciter, and a consequent rise in the voltage of the generator. The relay 73 therefore is designed to take care of slight, sudden or momentary variations in line voltage, while the relay Y is designed to respond only to gradual, large or prolonged variations. If the voltage should continue to fall after relay 73 has operated, the bar 51 of relay Y will continue to move to the right, and will actuate spring arms 53 successively so as to energize relays 59 and 58, one after the other, and short circuit the corresponding sections of resistance 65, 66 and 67.

Also, at the same time that coils 42 and 73 are energized, coil 76 of relay Z receives current and moves contact 20 into engagement with contact 21, thereby short-circuiting a portion of the winding of saturated choke coil 15. This has the effect of reducing the impedance of the series circuit including this choke coil and the pressure coil 14, and consequently more current flows through coil 14, thus restoring relay X to its original condition.

It will thus be seen that in either case the relay Z serves to act upon the relay X so as to move it in a sense the reverse of that in which it was moved by the original disturbance. In other words the relay Z serves to automatically restore the device X to its initial position. Instead of the device Z cutting out a portion of the winding of coils 15 or 16 it might be made to short-circuit a portion of pressure coil 14, as illustrated in Fig. 16, with the same result.

Figure 2:
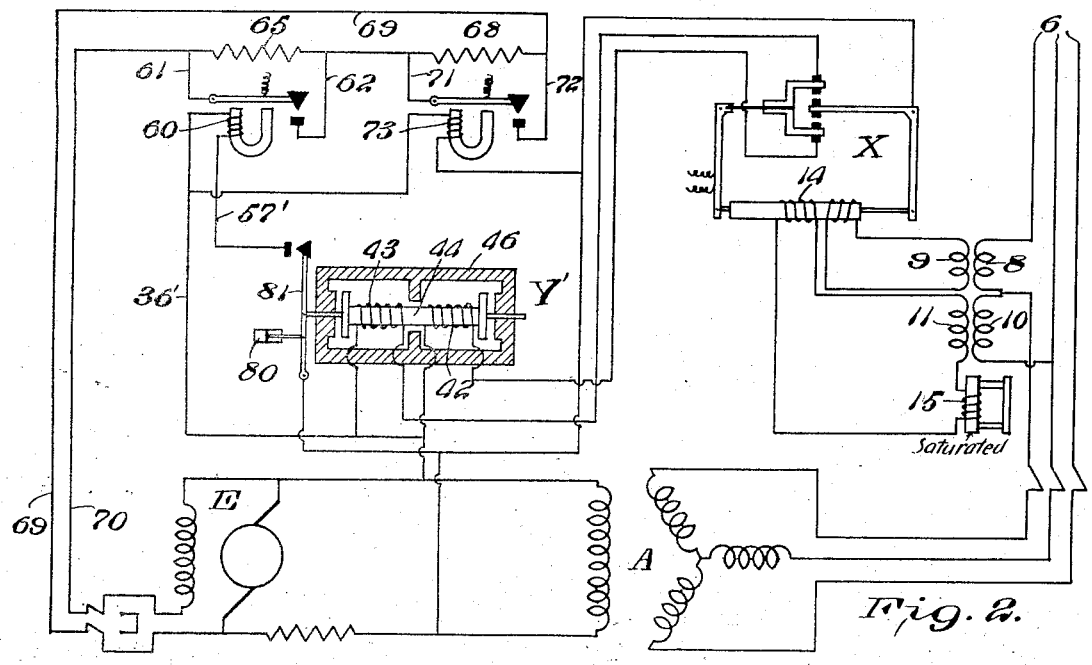
Fig. 2 illustrates a slightly different arrangement for accomplishing the same purpose.

In Fig. 2 I have shown a slightly different form of relay Y'. The coil 44 of this relay is connected to an arm 81 which closes a circuit comprising wires 36' and 57' extending to relay 60, which serves to control a section of resistance 65 in the same manner as in Fig. 1. This relay Y' is rendered sluggish by the use of a dash pot 80, and the quick acting relay 73 is employed to cut in or out the section of resistance 68 in response to momentary fluctuations on the line. In this figure only a single choke coil 15 is illustrated and this is shown in series with the pressure coil 14 of the regulating device.

Figure 3:
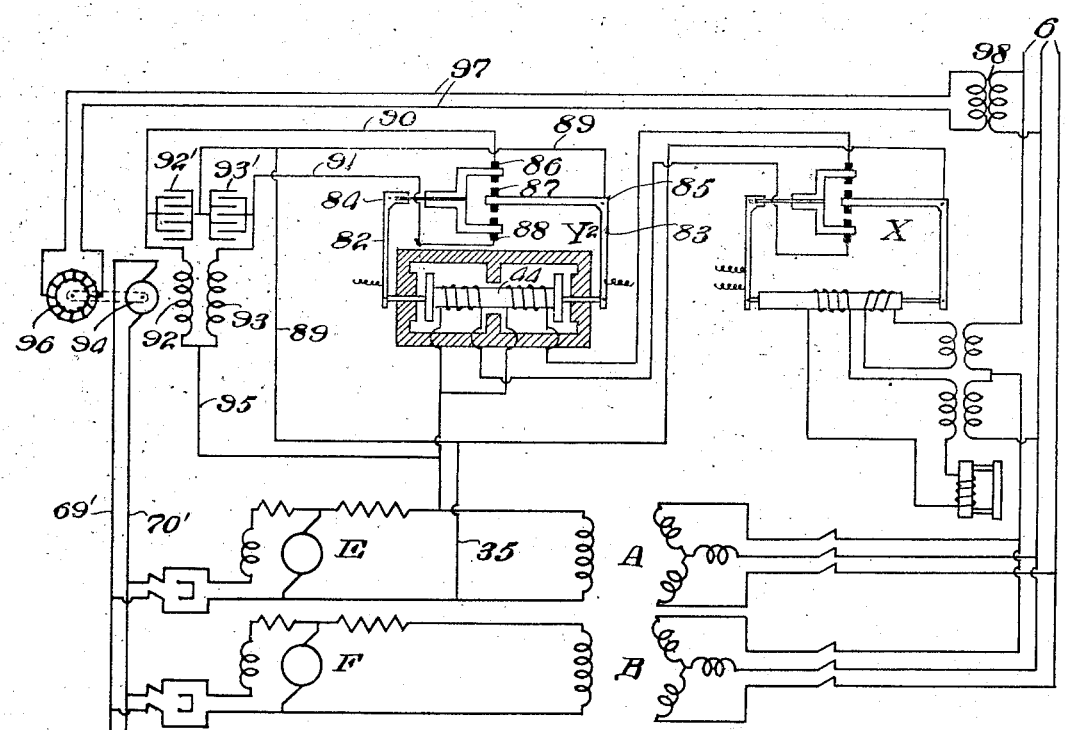
Fig. 3 is a similar diagram illustrating a slightly different method of regulating, and showing two generators in parallel.

In Fig. 3 I have shown the same form of regulating device X but a slightly different construction of relay Y². In this relay the core 44 is connected with bell crank levers 82 and 83, pivoted at 84 and 85 respectively, the former being provided with spaced insulated contacts 86 and 88, and the latter having a double contact 87 adapted to play between and engage the other two. Instead of operating directly upon resistance in the field circuit of the exciter I make use of an auxiliary generator having a differentially wound field, such generator being described and claimed in my co-pending application above referred to. The armature of the generator is indicated at 94 and is connected by means of the leads 69' and 70' with the exciter fields. The differential field coils are indicated at 92 and 93, their common junction point being connected by a wire 95 with one side of the exciter or other source of direct current, and the two ends of the field coils being connected by wires 90 and 91 respectively, with contacts 86 and 88. A wire 89 extends from the other side of the exciter to the lever 83, and condensers 92' and 93' are bridged across the contacts to prevent sparking. The generator 94 may be driven by means of a motor 96 connected by wires 97 with a transformer 98 fed from the line.

While this auxiliary generator with differential fields is similar to that shown in my prior application, I desire to point out particularly that while in such prior application, one or the other of the field windings is normally in circuit, in the present arrangement both of said field coils are normally on open circuit, and one or the other of them is thrown in by the relay $Y^2$ so as to assist or oppose the excitation of the exciter in accordance with fluctuations in the line voltage. It is thought that the operation of this arrangement will be apparent without further discussion. In this figure I have also shown a pair of generators A, B and a pair of exciters E, F, therefor.

In Fig. 4 I have illustrated the pressure coil 14 and an impedance coil 16 in shunt, and both in series with the secondary 11 of the transformer and the choke coil 15. I have also illustrated in this figure a slightly different form of relay or regulating device X' having a vertically arranged core 25' about which the coils 13 and 14 are wound.

In Fig. 5 I have shown a slightly different form of contact device which will be hereinafter more fully explained.

In Figs. 6 and 7 I have shown still another form of contact device $X^2$. This is modeled somewhat after the order of the relay Y of Fig. 1, and consists of a horizontal core 103 about which are wound the coils 13 and 14. The core is surrounded by a closed magnetic frame 104 and is provided with collars at its ends so that air gaps 105 and 106 are formed between the collars and the magnetic frame. The other features are believed to need no explanation.

Figure 8:
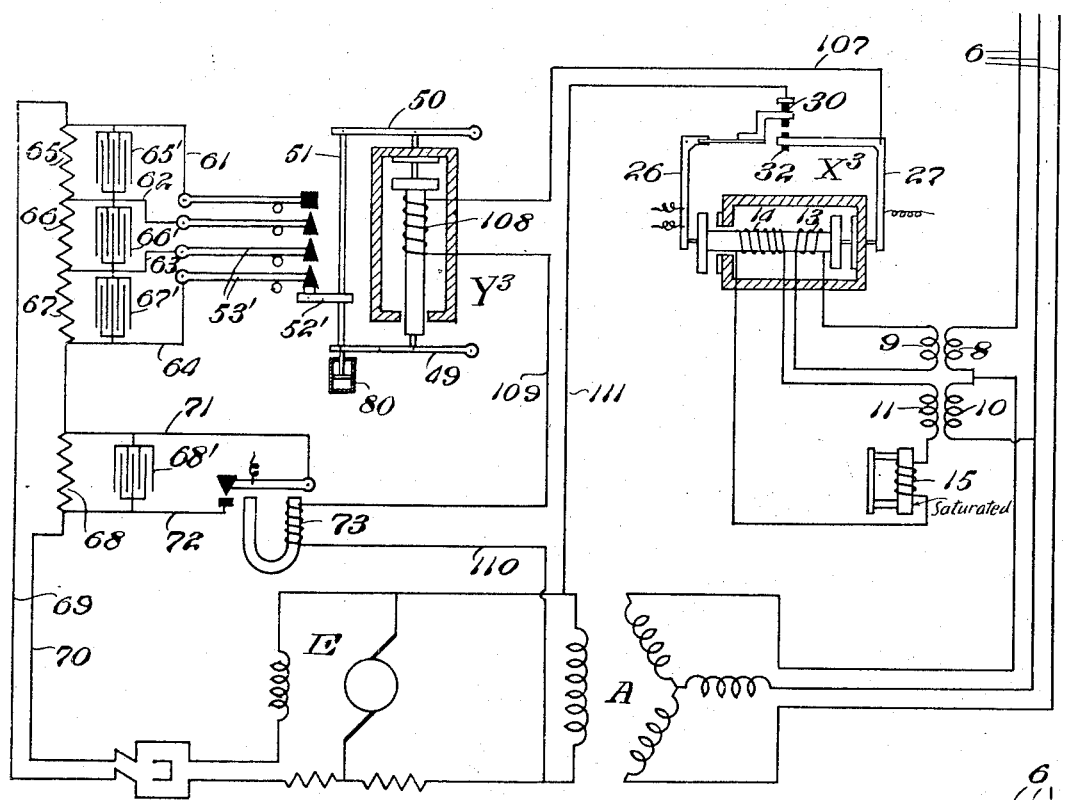
Fig. 8 is a complete diagram illustrating still another form of voltage regulating device.

In Fig. 8 I have illustrated a further slightly modified form of relay or regulating device $X^3$. This is similar to $X^2$ shown in Figs. 6 and 7, except that it employs only a single pair of contacts 30 and 32. From contact 32, carried by arm 27, extends a wire 107 to one side of a coil 108 of a relay $Y^3$, from the other side of which extends a conductor 109 to relay 73, from which leads a wire 110 to one side of the exciter. A wire 111 extends from the other side of the exciter to the contact 30. The core of relay $Y^3$ is attached to the pivoted levers 49 and 50 connected by the cross bar 51, and carrying a lug 52'. This lug is adapted to engage under the lowermost of a series of contact arms 53', and to lift them successively into contact with each other. These contact arms are connected by means of wires 61, 62, 63 and 64 to the junction points of sectional resistances 65, 66, 67 connected by means of the leads 69 and 70 with the field of the exciter E, as in Fig. 1. Condensers 65', 66', and 67' are preferably bridged across the contacts to prevent sparking. As in Fig. 1 also, a fourth sectional resistance 68 is provided and is controlled by the quick acting relay 73, a condenser 68' being preferably bridged across the contacts to prevent sparking. In view of the discussion in connection with Fig. 1 it is thought that the operation of the arrangement shown in Fig. 8 will be clear.

Figs. 9 and 10 have already been discussed and need no further comments.

Figure 11:
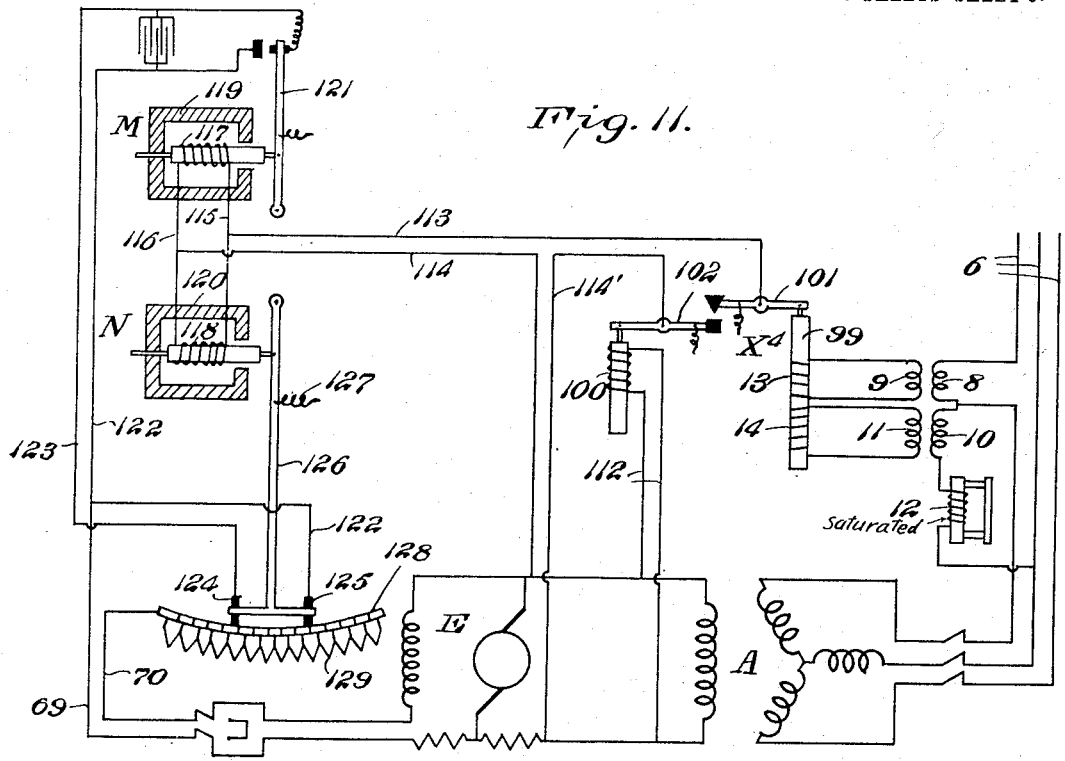
Fig. 11 is a diagram showing still another method of using a quick and sluggish relay in a voltage regulating apparatus.

In Fig. 11 I have shown a different arrangement of controlling apparatus. The contact making device $X^4$ comprises a vertical core 99 about which are wound the coils 13 and 14, which core is suspended from a contact lever 101. A second contact lever 102, arranged in coöperative relation therewith, carries a core about which is wound a coil 100 which is connected by means of wires 112 across the exciter circuit, and is therefore constantly energized. A wire 113 extends from lever 101 and a circuit formed by wires 114 and 114' extends from lever 102, and includes the exciter as a source of current. The wires 113 and 114 connect with wires 115 and 116, respectively, which latter are connected to the coils 117 and 118 of two relays M and N so as to form a closed loop. These relays are thus connected in parallel with each other, between the contact levers 101 and 102. The cores of the relays M and N work in magnetic frames 119 and 120 and the core of relay M is connected with a contact lever 121 which carries a contact flexibly connected with wire 123. This contact coöperates with a second contact which, in turn, is connected with a wire 122. The wires 122 and 123 extend to contacts 124 and 125 carried by the cross bar of an inverted T-shaped contact lever 126, adapted to be moved in one direction by the core of relay N, and in the other directiton by a spring 127. The contact brushes 124 and 125 bear upon a curved commutator 128, to the segments of which are connected sectional resistances 129. One end of this commutator is connected by wire 70 with one side of the field of exciter E while the other side of the exciter is connected by wire 69 with wire 122. It will be seen that upon fluctuations taking place in the line 6, the contact levers 101 and 102 will be brought into and out of engagement and will energize and deënergize relays M and N. Relay M, it will be seen, serves when energized to short-circuit that part of resistance 129 which is included between brushes 124 and 125. Relay M is made to act more quickly than relay N, and takes care of sudden variations by cutting in and out resistance as explained above, while for prolonged or gradual variations of line voltage the relay N moves the arm 126 back and forth over the commutator 128 and this cuts resistance 129 into and out of the exciter field circuit.

Figure 12:
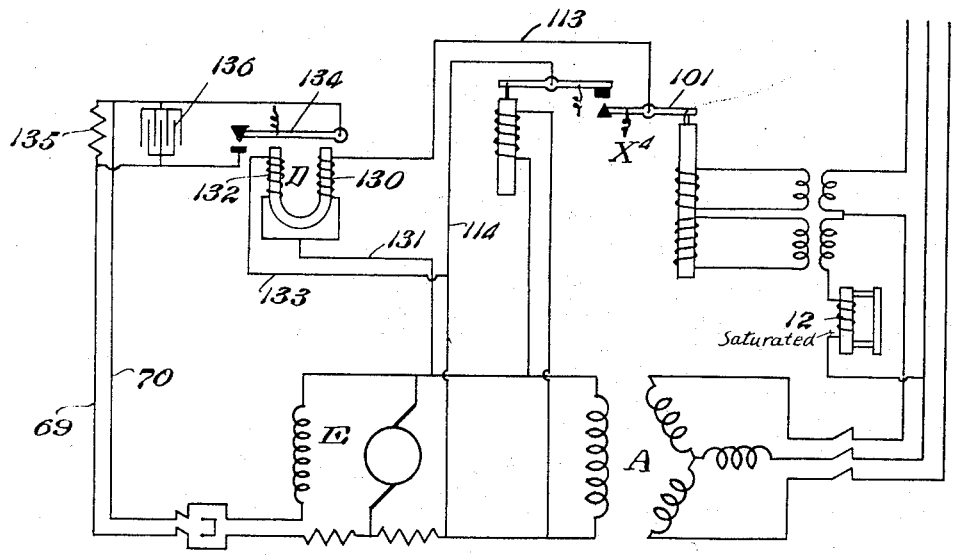
Fig. 12 is a diagram illustrating my sensitiveness increasing device in connection with the well known form of regulator employing a differential relay.

In Fig. 12 I have shown a similar contact making device $X^4$, but have illustrated it in connection with a differential wound relay D. Wire 113 connects with one coil 130 of such relay, while the other coil of the relay 132, is connected by wire 133 with wire 114, wire 131 forming a common return for the two coils. The armature 134, of the relay is adapted to cut a section of resistance 135 in and out of the exciter field circuit, a condenser 136 being preferably bridged around the contacts to prevent sparking.

In Fig. 13 I have shown my improved choke coil arrangement as applied to regulation by means of an auxiliary generator with a single field, such as shown in my former application. In this figure also I have illustrated a slightly different form of contact device $X^5$. This is similar to $X'$ of Fig. 4, except only a single pair of contacts are employed. These contacts are designated 137 and 138 and are connected by means of wires 139 and 140 with the wire 94ª of the auxiliary generator 94', the exciter or other source of direct current being included in the circuit by means of the conductor 141. A condenser 93ª is preferably bridged across the contacts to prevent sparking. A relay Z' has its winding permanently connected across the mains 69' and 70' of the auxiliary generator and its armature controls a circuit including conductors 142 and 143 and a portion of the winding of impedance coil 16. It will be seen therefore that when the pressure of the auxiliary generator falls below a certain point the armature of relay Z', will be moved against the contact by the spring and will thus short circuit a portion of the winding of impedance coil 16, thus restoring the contact device $X^5$ to its initial position in the same manner as explained in connection with Fig. 1.

In Fig. 14 I have illustrated a system in which the differentially wound auxiliary generator shown in Fig. 3 is combined directly with a contact making device X', such as shown in Fig. 4, without the interposition of a relay. In this figure I have also shown the use of a magnetic rectifier such as covered by my former patent No. 955,171, dated April 19, 1910, instead of an exciter for energizing the field winding of the main generator. As in Fig. 3 the auxiliary generator is indicated at 94, and the differentially wound fields are shown at 92 and 93. The common point of these fields is connected to one side of the direct current source by means of a wire 150, while a wire 149 connects the other side of such source with contact 146 of the device X'. Wires 147 and 148 connected to the contacts 144, 145, connect with the ends of the differential fields 92 and 93. The auxiliary generator 94 is connected by means of wires 151 and 152 in a circuit with the main generator field and with brushes which bear upon the commutator of the magnetic rectifier 155. This rectifier may be fed with 3-phase current by means of a transformer T connected with the line. The auxiliary generator 94 may be driven by means of a 3-phase motor 154 fed from the same transformer. As in Fig. 3 it will be noted that the circuits of both fields 92 and 93 are normally open. It is thought the operation of the system will be apparent from the previous discussion.

In Fig. 15 I have illustrated the type of contact device $X^5$ shown in Fig. 13, and have illustrated this in connection with a relay for controlling directly the voltage of the magnetic rectifier. Extending from the contact device $X^5$ are the conductors 139 and 140 the latter of which is connected with the source of direct current. The wire 139 connects with one side of the winding of a relay P, the other side of which is connected by means of a conductor 158, with the other side of the source of direct current. Connected in parallel with the relay P by means of wires 156, and 157 is a relay Z' whose function and operation is the same as in Fig. 13. Instead of being energized by the auxiliary generator, however, this relay, in Fig. 15, is controlled directly from the contact device $X^5$ in the same manner that the contact device X controls the relay Z in Fig. 1.

At 155' I have indicated a single phase magnetic rectifier fed from a transformer T', and included in the circuit is an impedance 160. This impedance is adapted to be short-circuited by means of wires 159, which extend to the armature of relay P. It is therefore obvious that when the contact $X^5$ is opened, the relay P will be deënergized and the impedance 160 short-circuited, and vice versa.

From the foregoing illustrations it will therefore be seen that my improved method of using a saturated choke coil is applicable to numerous and varied types of apparatus and may be employed for many purposes. It is particularly useful, however, when combined with the various arrangements for voltage regulation as shown in the accompanying drawings, and it is thought that the numerous advantages of the several features of my invention will be readily appreciated by those familiar with such matters.

What I claim is:—

1. The combination with an alternating current circuit, of a transformer having its primary connected across the same, an electro-responsive device connected with the secondary of the transformer, a saturated choke coil in series with said device and said secondary, and an impedance coil connected in shunt with said device.

2. The combination with a source of alternating current, of a translating device connected therewith, and responsive to variations in the voltage thereof, an impedance coil connected in shunt with said translating device, and means for short-circuiting a portion of said coil and thus decreasing the voltage impressed upon said translating device.

3. The combination with a source of alternating current, of a translating device connected therewith, and responsive to variations in the voltage thereof, a choke coil in series with said source and said device, and means for short-circuiting a portion of said coil and thus increasing the voltage impressed upon said device.

4. In a voltage regulator, the combination with a source of alternating current, of a device operatively connected therewith and responsive to variations in the voltage thereof, a choke coil connected in series with said device, and means rendered operative by the actuation of said device for varying the voltage impressed thereon.

5. The combination with an electrical circuit and a dynamo-electric machine associated therewith, of a regulator for the dynamo-electric machine comprising coöperating contact members, an actuating winding therefor energized from said circuit, an impedance in circuit with said winding and relay mechanism controlled by the said contact members for governing the field excitation of the dynamo-electric machine and the value of said impedance in circuit with the said winding.

6. The combination with an electrical circuit and a dynamo-electric machine associated therewith, of a regulator for the dynamo-electric machine comprising coöperating contact members, an actuating winding therefor energized from said circuit, an impedance associated with said winding and relay mechanism controlled by the said contact members for governing the field excitation of the dynamo-electric machine and the value of said impedance associated with the said winding.

7. The combination with an electric circuit and a dynamo-electric machine associated therewith, of a regulator for the dynamo-electric machine comprising coöperating contact members, an actuating winding therefor energized from said circuit, means in circuit with said winding for varying the excitation thereof and relay mechanism controlled by the said contact members for governing the field excitation of the dynamo-electric machine and the influence of said means in circuit with the said winding.

8. The combination with an electric circuit and a dynamo-electric machine associated therewith, of a regulator for the dynamo-electric machine comprising coöperating contact members, an actuating winding therefor energized from said circuit, means in circuit with said winding for varying the voltage impressed thereon and relay mechanism controlled by the said contact members for governing the field excitation of the dynamo-electric machine and the influence of said means in circuit with the said winding.

In testimony whereof I affix my signature in presence of two witnesses.

CHARLES H. KICKLIGHTER.

Witnesses:
E. EUDORA KIRK,
W. VANCE MARTIN.